United States Patent
Verkama et al.

(10) Patent No.: US 6,763,008 B2
(45) Date of Patent: Jul. 13, 2004

(54) MAINTAINING CONNECTION BETWEEN IN CONTROL POINT AND SWITCHING POINT

(75) Inventors: Markku Verkama, Espoo (FI); Jukka Wallenius, Helsinki (FI)

(73) Assignee: Nokia Corporation, Espoo (FI)

( * ) Notice: Subject to any disclaimer, the term of this patent is extended or adjusted under 35 U.S.C. 154(b) by 380 days.

(21) Appl. No.: 09/827,285

(22) Filed: Apr. 5, 2001

(65) Prior Publication Data

US 2001/0048673 A1 Dec. 6, 2001

Related U.S. Application Data

(63) Continuation of application No. PCT/FI99/00842, filed on Oct. 11, 1999.

(30) Foreign Application Priority Data

Oct. 12, 1998 (FI) .................................................. 982215

(51) Int. Cl.⁷ .......................... H04Q 7/00; H04L 12/66; H04L 12/28
(52) U.S. Cl. ........................ 370/331; 370/356; 370/401; 379/221.09; 455/433
(58) Field of Search ................................ 370/328, 331, 370/338, 401, 410, 360, 386, 356, 352; 379/221.08, 221.12, 221.14, 221.09, 219, 88.17; 455/436, 432, 433

(56) References Cited

U.S. PATENT DOCUMENTS

| 5,905,954 A | 5/1999 | Nguyen | |
|---|---|---|---|
| 6,101,387 A | * 8/2000 | Granberg et al. | 455/433 |
| 6,463,055 B1 | * 10/2002 | Lupien et al. | 370/353 |
| 6,529,490 B1 | * 3/2003 | Oh et al. | 370/331 |

FOREIGN PATENT DOCUMENTS

| JP | 09055799 | 2/1997 |
|---|---|---|
| WO | WO 96/13949 | 5/1996 |
| WO | WO 99/22528 | 5/1999 |

OTHER PUBLICATIONS prETS 300 374–1, "Intelligent Network (IN); Intelligent Network Capability Set 1 (CS1) Core Intelligent Network Application Protocol (INAP) Part 1: Protocol specification", *European Telecommunications Standards Institute*, pp. 1–213 (Jul. 1994).

* cited by examiner

Primary Examiner—Duc Ho
(74) Attorney, Agent, or Firm—Squire, Sanders & Dempsey

(57) ABSTRACT

A method of maintaining a connection between an intelligent network control point and a switching point in a telecommunications system, and a telecommunications system. A service connection between a control point and a switching point is provided with an identifier. The identifier is transmitted from the old switching point to the new switching point whenever the subscriber moves from the area of one switching point to the area of another switching point, whereby a service connection is set up from the new switching point to the control point by means of the identifier.

8 Claims, 1 Drawing Sheet

MAINTAINING CONNECTION BETWEEN IN CONTROL POINT AND SWITCHING POINT

This application is a continuation of international application serial number PCT/FI99/00842, filed Oct. 11, 1999.

BACKGROUND OF THE INVENTION

The invention relates to intelligent networks and particularly to maintaining a connection between an intelligent network control point and a switching point when a subscriber roams.

In telecommunications networks intelligence is related to the ability to obtain stored data, to process it and to make decisions based thereon. Even the present telecommunications networks, such as public switched telephone networks PSTN, are to some extent intelligent since they are capable of processing stored data for example in call routing. A typical "intelligent" facility in the present telecommunications networks is the conditional call forwarding where the call situation must be analyzed and the call must be routed according to the stored service profile of the call forwarding. However, such intelligent facilities are an integral part of the basic network, wherefore changing or adding of facilities requires, for example, software updates in all exchanges of the network.

An Intelligent Network (IN) is a network architecture which is added to the basic network and which enables faster, easier and more flexible implementation and control of services. This is achieved when control of services is removed from the telephone exchange to a separate-functional unit in the intelligent network. The services thus become independent of the operation of the basic network, wherefore the structure and software of the basic network do not have to be changed when services are altered or added. An intelligent network may comprise several service providers in addition to the actual network operator.

In the last few years intelligent networks have been standardized to a greater and greater extent in fixed networks. These standards define a certain operational and hierarchic model for intelligent networks. In this model service control is transferred from a basic network exchange to a service control point (SCP) in the intelligent network. The SCP comprises the required database and service logic programs (SLP), i.e. computer programs implementing the logical structure of a particular service (service logic). Intelligent network IN services are developed and tested with particular equipment called service creation environment (SCEP). A service management function (SMF) controls data related to the users and the network in a database, including service-specific data and service programs. A service switching point (SSP) is an exchange, for example an exchange in the basic network, which implements a service switching function (SSF), i.e. it identifies the IN service and activates interworking with the SCP. When a call with an IN service is set up, the SSP manages the connection arrangements. The IN service is provided such that when the SSP encounters service-related detection points it requests for instructions from the SCP. In other words, the SSP gives control to the SCP and starts waiting for operations from the SCP. When an IN service is triggered, a service logic program SLP is activated in the SCP and it determines the instructions the SCP transmits in each call phase to the SSP. The SSP interprets the instructions and starts the call control functions they require. Triggering of an IN service means that an IN function is activated due to an impulse occurring when a certain detection prerequisite is fulfilled.

As described above, the IN standards are developed for fixed telecommunication networks. It is difficult to implement IN functionality in a mobile network where mobile subscribers have no fixed access point in the network. However, it is necessary that for example mobile subscribers using IN services can be identified and data about the services of each subscriber can be found everywhere in the mobile network. This easily leads to massive databases and/or a need to transmit a great deal of data within the mobile network.

For example in a GSM (Global System for Mobile Communication) system a connection to an intelligent network service control point SCP is maintained such that as the subscriber roams from the area of a mobile services switching centre (MSC) operating as the IN SSP to the area of another MSC, the original centre acts as the controlling anchor MSC, to which data about events in the new MSC is transmitted by means of the MAP protocol. The connection to the IN SCP can thus remain in the original MSC. Instead, for example in a GPRS (General Packet Radio Service) system there is no anchor node corresponding to an anchor MSC, but the control of the packet-switched connection is transferred as the subscriber moves from the area of a support node (Serving GPRS Support Node, SGSN) operating as the IN SSP to the area of another support node. This means that the connection to the IN SCP must be transferred from one support node to another. A problem in the above-described arrangement is how to maintain the states of the service logic programs of the IN SCP corresponding to the connection when the support node changes. Maintaining the states is essential in order that the original service logic program SLP is able to control the packet-switched connection smoothly even if the subscriber roams in the areas of different support nodes.

BRIEF DESCRIPTION OF THE INVENTION

An object of the invention is to develop a method and an apparatus implementing the method such that the aforementioned problems can be solved. Specifically, the invention relates to a method of maintaining a connection between an intelligent network control point and a switching point in a telecommunications system comprising at least one subscriber and an intelligent network comprising service switching points and at least one service control point that contains service logic programs. The method is characterized by providing a service connection with an identifier when a service connection is set up between an intelligent network control point and a first switching point or when the intelligent network switching point used in the service connection changes, transmitting the service connection identifier and preferably the address of the control point and the state data of the switching point corresponding to the service connection from the old switching point to the new switching point whenever the subscriber moves from the area of one switching point to the area of another switching point, and setting up a service connection by means of the transmitted data from the new switching point to the control point, whereafter the service logic program to be used, corresponding to the service connection, is identified by means of the service connection identifier.

The invention is based on the idea of providing a service connection in an intelligent network with an identifier that links the service logic program of the IN control point and the corresponding service connection. The service connection identifier can be formed either in the switching point or in the control point of the intelligent network. The service connection identifier is any identifier which identifies a particular service logic instance in a specified service control point. The service logic instance is an embodiment of a service logic program in the execution. In the following, a 'service logic program' refers to a service logic instance. The service connection identifier is formed either when the service connection is set up or, alternatively, the identifier is obtained from the IN control point after it has been informed of a change in the switching point. A service connection is set up between an intelligent network switching point and a control point after an IN service has been triggered or when the service control function requests the switching point to activate an event (e.g. a call). The service connection enables the transmission of operations of the intelligent network application protocol (INAP) between the service control function and the switching point of the intelligent network. One service connection is connected to one active event in the switching point, such as a call or a packet data connection (GPRS MM context or PDP context), or to several events that are logically related, for example associated with the same subscriber. If there is a change in the switching point from which the service connection to the control point is set up, in which case the service connection is re-established from a new switching point to the control point, the new connection can be guided by means of the identifier to use the original service logic program.

An advantage of the method according to the invention is that the service logic programs maintain their states, and therefore the same service logic program is able to monitor the entire service connection from the beginning to the end even if the connection had to be re-established every now and then from a new switching point as a result of a change in the switching point.

The invention also relates to a telecommunications system comprising at least one subscriber and an intelligent network comprising service switching points and at least one service control point comprising service logic programs. The system is characterized in that it is arranged to provide a service connection with an identifier when a service connection is set up between an intelligent network service control point and a first switching point or when the intelligent network switching point used for the service connection changes, to transmit the service connection identifier and preferably the address of the control point and the state data of the switching point corresponding to the service connection from the old switching point to the new switching point whenever the subscriber moves from the area of one switching point to the area of another switching point, and to set up a service connection by means of the transmitted data from the new switching point to the control point, whereafter the service logic program to be used, corresponding to the service connection, is identified by means of the service connection identifier. With such a system the advantages provided by the method according to the invention can be achieved in a simple manner.

BRIEF DESCRIPTION OF THE DRAWINGS

The invention will be described below in greater detail in connection with preferred embodiments, with reference to the accompanying drawings, in which.

DETAILED DESCRIPTION OF THE INVENTION

Even though the use of the invention will be described below in connection with a GPRS system, this does not restrict the application of the invention in other telecommunications systems. Examples of other systems where the invention can be applied include a third-generation universal mobile telephone system (UMTS).

The general packet radio service GPRS is a new service in the GSM system and it is one of the objects of the GSM phase 2+ standardization work of the ETSI (European Telecommunication Standards Institute). The GPRS operational environment comprises one or more subnetwork service areas, which are interconnected by a GPRS backbone network. A subnetwork comprises a number of packet data service nodes, which will be referred to herein as serving GPRS support nodes (or agents), each of which is connected to the GSM mobile communication network such that it can provide mobile stations with a packet data service via several base stations or cells. The intermediate mobile communication network provides circuit-switched or packet-switched data transmission between a support node and mobile stations. Different subnetworks are, in turn, connected to an external data network, for example a public switched packet data network PSPDN. The GPRS service thus provides packet data transmission between mobile stations and external data networks with the GSM network operating as an access network. A characteristic of the GPRS service network is that it operates almost independently of the GSM network.

Figure 1:
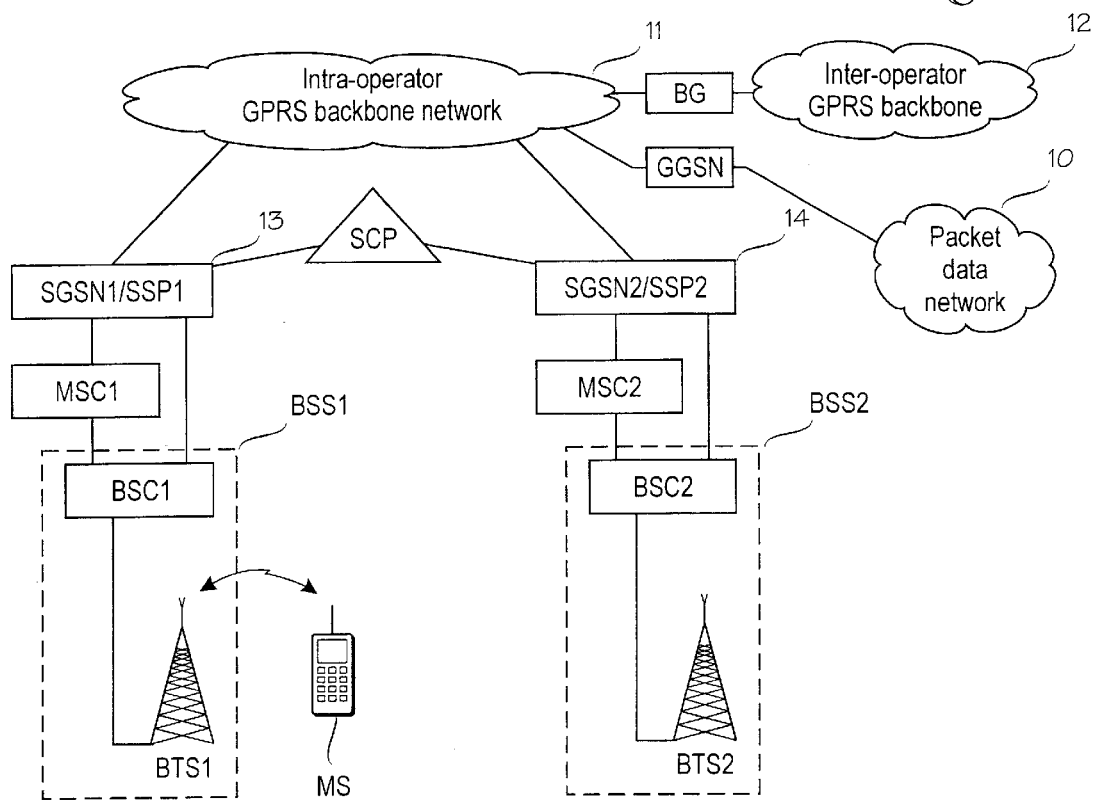
FIG. 1 shows a combination of a mobile system and an intelligent network.

FIG. 1 shows a typical GPRS network arrangement. The architecture of GPRS networks is not as developed as that of GSM networks, for example. Therefore all GPRS terms should be understood as descriptive and not restrictive terms. Network elements BSC (BSC1 and BSC2) and MSC (MSC1 and MSC2) are known from a typical GSM network. The arrangement shown in FIG. 1 comprises a separate serving GPRS support node SGSN (13 and 14). This support node 13, 14 controls certain packet radio service functions on the network side. These functions include log-in and log-out of mobile stations MS into and out of the system, updates of MS routing areas, and routings of data packets to correct destinations. The SGSN 13, 14 can be located at a base station BTS1, BTS2, a base station controller BSC1, BSC2 or a mobile services switching centre MSC1, MSC2, or it may be remote from all these elements. An area controlled by one base station controller BSC1, BSC2 is called a base station subsystem BSS (BSS1 and BSS2).

The intermediate mobile communication network provides packet-switched data transmission between a support node and mobile stations. The different subnetworks, in turn, are connected to an external data network 10, such as a public switched packet data network PSPDN, via a special gateway GPRS support node GGSN. Therefore the GPRS service enables packet data transmission between mobile stations MS and external data networks 10 with the GSM network operating as an access network. An alternative to the GGSN is a router. The "gateway GPRS support node GGSN" refers below also to a structure where the GGSN is replaced with a router. The GGSN comprises, for example, the routing information of the GPRS subscribers, such as SGSN addresses and billing data. The SGSN and the GGSN functionalities can be combined in the same physical node.

The GPRS network connected to the GSM network shown in FIG. 1 comprises two serving GPRS support nodes SGSN (13 and 14) and one gateway GPRS support node GGSN. These different nodes, SGSN (13, 14) and GGSN, are interconnected by an intra-operator backbone network 11. It should be understood that the GPRS network may comprise any number of support nodes 13, 14 and gateway support nodes GGSN.

Each support node 13, 14 controls packet data service in the area of one or more cells in a cellular-type packet radio network. For this purpose each support node 13, 14 is connected to a particular local part of the GSM mobile system. This connection is typically implemented to a mobile services switching centre but in some cases it might be preferable to make the connection directly to a base station system BSS1, BSS2, i.e. to a base station controller BSC1, BSC2 or to a base station BTS1, BTS2. A mobile station MS in a cell communicates over the radio interface with the base station BTS1, BTS2 and further via the mobile communication network with the support node 13, 14 to the service area of which the cell belongs. In principle the mobile communication network between the support node 13, 14 and the mobile station MS only forwards packets between the two. For this purpose the mobile network can provide either a circuit-switched connection or packet-switched transmission of data packets between the MS and the serving support node 13, 14. It should be noted, however, that the mobile network only provides a physical connection between the MS and the support node 13, 14, and the exact operation and structure thereof are not significant to the invention.

A border gateway BG connects a GPRS network of an operator to GPRS networks of other operators and to data networks, such as an inter-operator backbone network 12 or an IP network. The inter-operator backbone network 12 is a network via which the GPRS networks of different operators are able to communicate together. This communication is required to support GPRS roaming between different GPRS networks.

Intelligent network functions can be connected to the GPRS network for example such that the support nodes SGSN (13, 14) in the GPRS system operate as intelligent network (IN) switching points SSP (13, 14), as shown in FIG. 1. The switching point 13, 14 implements the service switching function SSF and provides users with access to the IN services independently of the service. In the UMTS, a node corresponding to the SGSN (13, 14) is a third-generation SGSN (3GN SGSN). The service control point SCP is a separate functional unit. The SCP comprises, for example, a required database DB and the service logic programs SLP, i.e. computer programs that implement the logic structure of a particular service (service logic). It should be noted that FIG. 1 only shows the network elements that are essential to describe the invention.

Figure 2:
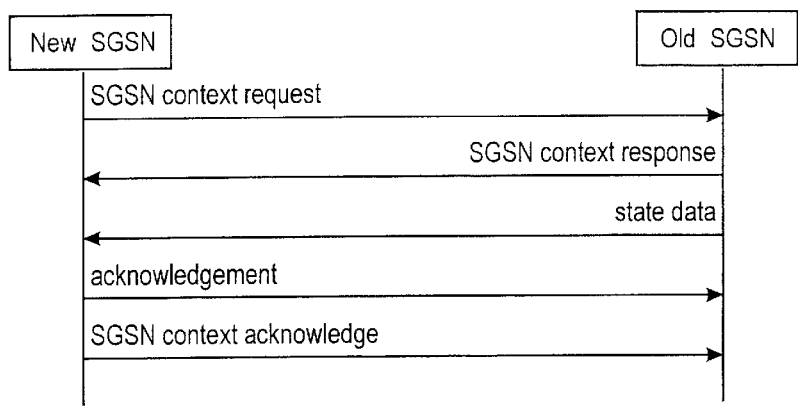
FIG. 2 shows a method of transferring state data corresponding to a service connection in an embodiment of the invention.

In the method according to the invention, for example when a service connection is set up between the control point SCP and the switching point SSP (13 or 14) of the intelligent network due to a call made by a subscriber MS, and the service logic program SLP is activated for the connection, i.e. the IN service is triggered, an identifier is formed at the same time in order that the service connection and the corresponding service logic program SLP can be identified. Alternatively, the service connection identifier can be created only after the switching point SSP (13 or 14) has changed. The identifier can be created, for example, in the switching point SSP (13 or 14) or in the service control point SCP. The identifier can be created, for instance, by the aforementioned service logic program SLP of the SCP, which indicates the identifier to the switching point 13 or 14 from which the service connection is originally set up to the control point. The form of the identifier is not essential in the invention and it can be, for example, a consecutive number or any identifier that identifies a specific service logic instance in a particular service control point SCP. The switching point 13, 14 and the control point SCP are interconnected, for example, by a signalling network according to Signalling System Number 7 (SS7), which is a known signalling system described in the CCITT (presently ITU-T) recommendations. In mutual communication the switching point 13, 14 and the control point SCP utilize, for example, the INAP (intelligent network application protocol) described in the ETSI (European Telecommunications Standards Institute) standard ETSI IN CS1 INAP Part 1: Protocol Specification, prETS 300 374-1. In the SS7 protocol stack the INAP layer is on top and below it are the following layers: TCAP (transaction capabilities application part), SCCP (signalling connection control point) and MTP (message transfer part). When a subscriber MS (a call) changes from the area of a particular (the old) switching point 13 or 14 to the area of another (the new) switching point 13 or 14, the identifier of the service connection, and if required also the address of the control point SCP used, if it is not included for example in the service connection identifier or is not otherwise known to the new switching point, are also transmitted to the new switching point 13 or 14. The state data corresponding to the service connection of the old switching point 13 or 14 is preferably transmitted, too, so that the new switching point 13 or 14 can immediately set its state to correspond to the service connection. The state data corresponding to the service connection may include the following data, for example: data about the GPRS packet connection gathered in the previous SGSN to be reported to the SCP, data about event detection points set by the SCP and possible criteria for reporting thereon, data about reports, independent of the detection points, requested by the SCP, and possible criteria for reporting thereon. The data gathered in the previous SGSN for reporting to the SCP may be, for example, information about the amount of transmitted data, specified according to the quality of service and the PDP context. The aforementioned data can be transmitted, for example, simultaneously with the transmission of so-called GPRS context data (SGSN Context), which is included in an inter-SGSN routing area update and which is defined in the GPRS recommendations. Such a inter-SGSN routing area update could also comprise a specific message which carries the aforementioned data, and an acknowledgement of the message. FIG. 2 shows a procedure where the state data and the acknowledgement thereof are transmitted by means of particular messages between the old and the new SGSN. A connection to the IN control point is set up from the new switching point by means of the aforementioned data. In other words, the new switching point 13 or 14 transmits to the SCP a call set-up request containing the service connection identifier obtained from the old switching point. By means of the identifier the SCP is able to connect the new connection to the service logic program SLP of the old connection, which has the same identifier. In this manner the service connection remains visibly unbroken even if it may consist of several separate connections formed from different switching points 13, 14 to the control point SCP.

In a preferred embodiment of the invention, the control point SCP initiates the release of a connection between the SCP and the old switching point 13, 14 only after a new connection has been set up. According to an alternative embodiment of the invention, the control point SCP is informed of a change in the switching point 13 or 14 so that the SCP will wait for the call setup by the new switching point 13 or 14. In such a case the connection between the SCP and the old switching point 13 or 14 can already be disconnected before the new connection is set up, such that the service logic program SLP corresponding to the connection is left to wait for the establishment of the service connection from the new switching point 13 or 14 in order that the SLP can be connected to the new connection. When the connection from the new switching point 13 or 14 is set up, it is connected by means of the identifier to the correct SLP, as described above. According to both embodiments the original SLP is able to control the entire service connection flexibly, even though the switching point 13 or 14 possibly changes and the service connection must be transferred to a new switching point 13 or 14.

It is evident for those skilled in the art that as the technology develops the basic idea of the invention can be implemented in several different manners. Therefore the invention and the embodiments thereof are not restricted to the examples described above but they may vary within the scope of the claims.

What is claimed is:

1. A method of maintaining a connection between an intelligent network control point and a switching point in a telecommunications system comprising at least one subscriber and an intelligent network comprising service switching points and at least one service control point that contains service logic programs, the method comprising:

provinding a service connection with an identifier when a service connection is set up between an intelligent network control point and a first switching point or when the intelligent network switching point used in the service connection changes;

transmitting the service connection identifier and preferably the address of the control point and the state data of the switching point corresponding to the service connection from the old switching point to the new switching point whenever the subscriber moves from the area of one switching point to the area of another switching point;

setting up a service connection by means of the transmitted data from the new switching point to the control point, whereafter the service logic program to be used, corresponding to the service connection, is identified by means of the service connection identifier;

wherein the telecommunication system is a packet network and the intelligent network switching point is a support node of a packet network; and wherein the state data corresponding to the service connection contains instructions for reporting the data from the switching point to the control point and information gathered in the switching point to be reported to the control point.

2. The method of claim 1, further comprising: disconnecting the service connection between the control point and the old switching point when the subscriber moves from the area of one switching point to the area of another switching point only after the service connection between the control point and the new switching point has been set up.

3. The method of claim 1, further comprising: disconnecting the service connection between the control point and the old switching point when the subscriber moves from the area of one switching point to the area of another switching point before the service connection between the control point and the new switching point has been set up, but maintaining in the control point the service logic program corresponding to the service connection for the purpose of setting up a service connection between the control point and a new switching point.

4. The method of claim 1, further comprising: transmitting data about the service connection from the old switching point to the new switching point in an inter-SGSN routing area update at the same time when the context data of the support nodes is transmitted or in a separate message.

5. A telecommunications system comprising at least one subscriber and an intelligent network comprising service switching points and at least one service control point comprising service logic programs, the system being arranged to:

provide a service connection with an identifier when a service connection is set up between an intelligent network service control point and a first switching point or when the intelligent network switching point used for the service connection changes; to transmit the service connection identifier and preferably the address of the control point and the state data of the switching point corresponding to the service connection from the old switching point to the new switching point whenever the subscriber moves from the area of one switching point to the area of another switching point; to set up a service connection by means of the transmitted data from the new switching point to the control point, whereafter the service logic program to be used, corresponding to the service connection, is identified by means of the service connection identifier;

wherein the telecommunication system is a packet network and the intelligent network switching point is a support node of a packet network; and wherein the state data corresponding to the service connection contains instructions for reporting the data from the switching point to the control point, and information gathered in the switching point to be reported to the control point.

6. The telecommunicatons system of claim 5, the system being also arranged to disconnect the service connection between the control point and the old switching point when the subscriber moves from the area of one switching point to the area of another switching point only after the service connection between the control point and the new switching point has been set up.

7. The telecommunicatons system of claim 5, the system being also arranged to disconnect the service connection between the control point and the old switching point when the subscriber moves from the area of one switching point to the area of another switching point.

8. The telecommunicatons system of claim 5, the system being also arranged to transmit data about the service connection from the old switching point to the new switching point in an inter-SGSN routing area update at the same time when the context data of the support nodes is transmitted or in a separate message.

* * * * *